United States Patent
Foss et al.

(10) Patent No.: US 10,327,089 B2
(45) Date of Patent: Jun. 18, 2019

(54) POSITIONING AN OUTPUT ELEMENT WITHIN A THREE-DIMENSIONAL ENVIRONMENT

(71) Applicants: Richard Foss, Grahamstown (ZA); DSP4YOU Ltd., Hong Kong (CN)

(72) Inventors: Richard Foss, Eastern Cape (ZA); Antoine Rouget, Hong Kong (CN)

(73) Assignees: DSP4YOU LTD., Hong Kong (CN); Richard Foss, Eastern Cape (ZA)

( * ) Notice: Subject to any disclaimer, the term of this patent is extended or adjusted under 35 U.S.C. 154(b) by 0 days.

(21) Appl. No.: 15/566,495

(22) PCT Filed: Apr. 14, 2016

(86) PCT No.: PCT/IB2016/052117
§ 371 (c)(1),
(2) Date: Oct. 13, 2017

(87) PCT Pub. No.: WO2016/166687
PCT Pub. Date: Oct. 20, 2016

(65) Prior Publication Data
US 2018/0299962 A1    Oct. 18, 2018

(30) Foreign Application Priority Data
Apr. 14, 2015 (ZA) .................. 2015/02484

(51) Int. Cl.
*G06F 3/01* (2006.01)
*H04R 5/02* (2006.01)
(Continued)

(52) U.S. Cl.
CPC .............. *H04S 7/303* (2013.01); *G06F 3/017* (2013.01); *G06F 3/0346* (2013.01); *H04R 5/02* (2013.01); *H04S 7/30* (2013.01); *H04S 2400/11* (2013.01)

(58) Field of Classification Search
CPC ...... G06F 3/017; H04S 7/303; H04S 2400/11; H04S 7/00–7/40; H04R 5/02
See application file for complete search history.

(56) References Cited

U.S. PATENT DOCUMENTS 6,908,386 B2    6/2005    Suzuki et al.
7,610,110 B1 *  10/2009   Johnston .................. H04S 7/40
                                                              381/58
(Continued)

FOREIGN PATENT DOCUMENTS

WO    WO 2009/117450      9/2009

OTHER PUBLICATIONS

PCT International Search Report and Written Opinion issued in International Application No. PCT/IB2016/052117, dated Jul. 12, 2016.
(Continued)

*Primary Examiner* — Patrick F Marinelli
(74) *Attorney, Agent, or Firm* — Parker Highlander PLLC

(57) ABSTRACT

Systems and methods for positioning an output element (102, 602) within a three-dimensional environment (104, 604) are described. Movement data relating to movement of a mobile device (120, 620) is obtained (206, 262). The movement data is mapped (208, 264) to movement of a simulated output element (503) in a virtual environment (505), which simulates the three-dimensional environment. The movement of the simulated output element is associated with movement of an output element within the three-dimensional environment so as to control the position of the output element within the three-dimensional environment. In one exemplary embodiment an output element (102) being a sound source is positioned in a three-dimensional, immersive sound environment (104). In another exemplary embodiment a focal point of a light beam (602) is positioned in a three-dimensional theatrical environment (604). The
(Continued)

described systems and methods enable a user to control the real-time and/or recorded position and/or movement of an output element by manipulating the orientation of a mobile device (120, 620).

16 Claims, 8 Drawing Sheets

(51) Int. Cl.
*H04S 7/00* (2006.01)
*G06F 3/0346* (2013.01)

(56) References Cited

U.S. PATENT DOCUMENTS

| | | | | |
|---|---|---|---|---|
| 8,472,632 | B2* | 6/2013 | Riedel | H04S 7/303 |
| | | | | 340/539.13 |
| 9,989,777 | B1* | 6/2018 | Comploi | G02B 27/2292 |
| 10,149,088 | B2* | 12/2018 | Patil | H04S 7/301 |
| 2006/0170562 | A1 | 8/2006 | Choi et al. | |
| 2007/0116306 | A1* | 5/2007 | Riedel | H04S 7/303 |
| | | | | 381/303 |
| 2009/0046864 | A1* | 2/2009 | Mahabub | H04S 7/30 |
| | | | | 381/17 |
| 2010/0200753 | A1* | 8/2010 | Westaway | F21V 17/02 |
| | | | | 250/338.1 |
| 2011/0144783 | A1* | 6/2011 | Reichelt | H04S 7/30 |
| | | | | 700/94 |
| 2011/0271186 | A1 | 11/2011 | Owens | |
| 2012/0062700 | A1 | 3/2012 | Antonellis et al. | |
| 2012/0293075 | A1 | 11/2012 | Engelen et al. | |
| 2013/0083948 | A1* | 4/2013 | Schmidt | H04R 5/02 |
| | | | | 381/303 |
| 2013/0170815 | A1* | 7/2013 | Coskun | H04N 9/8205 |
| | | | | 386/230 |
| 2013/0232149 | A1* | 9/2013 | Smith | G06F 16/972 |
| | | | | 707/740 |
| 2014/0153751 | A1 | 6/2014 | Wells | |
| 2014/0314239 | A1 | 10/2014 | Meyer et al. | |
| 2015/0061938 | A1* | 3/2015 | Moraleda | G01S 5/0294 |
| | | | | 342/452 |
| 2016/0277861 | A1* | 9/2016 | Reilly | H04R 27/00 |
| 2017/0123491 | A1* | 5/2017 | Hansen | G06F 3/012 |
| 2018/0197551 | A1* | 7/2018 | McDowell | H04S 7/30 |
| 2018/0242095 | A1* | 8/2018 | Patil | H04S 7/301 |
| 2018/0299962 | A1* | 10/2018 | Foss | H04S 7/30 |

OTHER PUBLICATIONS

Zactrack: "Automatisches Follow-System," located at http://www.zkoor.com/websiteredax/files/zactrack_folder_dt.pdf, Mar. 15, 2013.

* cited by examiner

POSITIONING AN OUTPUT ELEMENT WITHIN A THREE-DIMENSIONAL ENVIRONMENT

CROSS-REFERENCE TO RELATED APPLICATIONS

This application is a national phase application under 35 U.S.C. § 371 of International Application No. PCT/IB2016/052117, filed Apr. 14, 2016, which claims priority from South African provisional patent application number 2015/02484 filed on 14 Apr. 2015, each of which is incorporated by reference herein.

FIELD OF THE INVENTION

This invention relates to systems and methods for positioning an output element within a three-dimensional environment.

BACKGROUND TO THE INVENTION

Immersive sound is a fairly recent development in the audio industry and generally refers to sound which may be reproduced from and experienced in three dimensions.

An immersive sound experience may be made up of a number of sound sources which, when output in an immersive sound system, may appear to a listener to emanate from different and sometimes varying positions. For example in an immersive sound experience, a sound source being a dog barking may appear, to the listener, to be emanating from the rear left-hand-side of the listener. Another sound source, being an aeroplane, for example, may appear to the listener to originate from the upper rear right-hand-side of the listener and travel over the listener towards the upper front left-hand-side.

The placing and moving of a sound source within a three dimensional immersive sound environment can typically be done during production where, for example, a sound engineer places the sound source within the immersive environment.

Data as to from where in an immersive environment a sound source is designed to emanate is typically stored in association with the sound source's audio signal data in an audio object file. This audio object file may then be used in replaying the sound source in an immersive sound environment such that it appears to a listener to emanate from its intended position.

There are, however, some limitations associated with the placing and varying of sound sources within a three dimensional immersive environment. In some cases, sound sources may be placed or positioned using a user interface provided by a sound mixing program, such as Spatial Audio Designer™ by New Audio Technology GmbH. The user interface may provide an x-y-plane screen for moving the sound source in the x-y-plane and a separate y-z- or x-z-plane screen for adjusting the height of a sound source. A restriction associated with such a user interface is that simultaneous, or unbroken, adjustment of a sound source's location in the x-y-plane and its height may be cumbersome, at best.

Specialist hardware alternatives do exist, typically providing a joystick with which the sound source can be positioned, such as the Nuage™ surround panner provided by JL Cooper Electronics. While such hardware devices may alleviate this problem to some extent, they may not offer versatility and can be expensive and fairly immobile.

There is accordingly a need for a solution which alleviates these and/or other problems, at least to some extent.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with a first aspect of the invention there is provided a method for positioning an output element within a three-dimensional environment including one or more output devices, the method comprising: obtaining movement data relating to movement of a mobile device; mapping the movement data to movement of a simulated output element in a virtual environment, the virtual environment simulating the three-dimensional environment; and associating the movement of the simulated output element with movement of an output element within the three-dimensional environment, so as to control the position of the output element within the three-dimensional environment by controlling output of the one or more output devices.

A further feature provides for the method to include receiving output device location data relating to locations of one or more output devices in the three-dimensional environment.

A still further feature provides for the method to include generating the virtual environment, the virtual environment simulating the three-dimensional environment and including one or more simulated output devices and the simulated output element.

Yet further features provide for obtaining movement data relating movement of the mobile device to include obtaining the movement data from one or both of an accelerometer and a gyroscope of the mobile device; for obtaining movement data relating to movement of a mobile device to include obtaining movement data relating to rotation of the mobile device around an axis thereof; for the movement data to include rotation data relating to rotation of the mobile device around the axis; and for mapping the movement data of the mobile device to movement of the simulated output element to include transforming the rotation data to linear movement of the simulated output element along a corresponding axis thereof.

A further feature provides for the method to include periodically recording a set of coordinates based on the position of the simulated output element within the virtual environment.

A still further feature provides for associating the movement of the simulated output element with movement of an output element within the three-dimensional environment to include: generating time-stamped coordinates based on a position of the simulated output element in the virtual environment; and, associating the time-stamped coordinates with an output file arranged to control the position of the output element within the three-dimensional environment by controlling output of the one or more output devices. Generating time-stamped coordinates based on a position of the simulated output element in the virtual environment may include time-stamping each recorded set of coordinates.

In one embodiment the output element may be a sound source in an immersive sound environment in which the one or more output devices are speakers. A further feature provides for associating the movement of the simulated output element with movement of an output element within the three-dimensional environment to include: determining speaker amplitude data based on time-stamped coordinates and output device location data; and, transmitting the speaker amplitude data to a renderer for output of the sound source by speakers so as to position the output element within the three-dimensional environment.

In another embodiment the output element may be one of a light beam or focal point of one or more light beams in a theatrical environment in which the output devices are spot lights. Further features provide for associating the movement of the simulated output element with movement of an output element within the three-dimensional environment to include mapping movement of the simulated output element to movement of the output devices; for generating time-stamped coordinates based on a position of the simulated output element in the virtual environment to include generating time-stamped orientation coordinates of the output devices; and for associating the time-stamped coordinates with an output file to include associating the time-stamped orientation coordinates of the output devices with a digital multiplex (DMX) signal.

In accordance with a second aspect of the invention, there is provided a method for positioning an output element within a three-dimensional environment including one or more output devices, the method being conducted at a mobile device and comprising: obtaining movement data relating to movement of the mobile device; mapping the movement data to movement of a simulated output element in a virtual environment, the virtual environment simulating the three-dimensional environment; recording a set of coordinates based on the position of the simulated output element within the virtual environment; and, transmitting the set of coordinates to a server computer for time-stamping and association with an output file thereat.

In accordance with a third aspect of the invention, there is provided a method for positioning an output element within a three-dimensional environment including one or more output devices, the method being conducted at a server computer and comprising: receiving a set of coordinates from a mobile device, the set of coordinates having been recorded based on a position of a simulated output element, wherein changes in position of the output element are mapped from movement of the mobile device; time-stamping the received set of coordinates; and, associating the time-stamped coordinates with an output file.

In accordance with a fourth aspect of the invention there is provided a system for positioning an output element within a three-dimensional environment including one or more output devices, the system comprising: an obtaining component for obtaining movement data relating to movement of a mobile device; a mapping component for mapping the movement data to movement of a simulated output element in a virtual environment, the virtual environment simulating the three-dimensional environment; and an associating component for associating the movement of the simulated output element with movement of an output element within the three-dimensional environment, so as to control the position of the output element within the three-dimensional environment by controlling output of the one or more output devices.

A further feature provides for the system to include a mobile device which provides the obtaining component and mapping component and which further includes: a recording component for recording a set of coordinates based on the position of the simulated output element within the virtual environment; and a communication component for transmitting the set of coordinates to a server computer.

Still further features provide for the communication component to receive output device location data relating to locations of one or more output devices in the environment; and for the mobile device to include a user interface component operable to generate a virtual environment simulating the three-dimensional environment and including one or more simulated output devices and the simulated output element.

Yet further features provide for the mobile device to include a movement sensor for sensing movement of the mobile device, for the movement sensor to include one or both of a gyroscope and an accelerometer; for the obtaining component to obtain movement data from the movement sensor; for the obtaining component to obtain movement data relating to rotation of the mobile device around an axis thereof; for the movement data to include rotation data relating to the rotation; and for the mapping component to transform the rotation data to linear movement of the simulated output element along a corresponding axis thereof.

A still further feature provides for the system to include the server computer which provides the associating component and which further includes: a communication component for receiving a set of coordinates from the mobile device.

Yet further features provide for the associating component to include: a time-stamping component for generating time-stamped coordinates based on a position of the simulated output element in the virtual environment; and for the associating component to be configured to associate the time-stamped coordinates with an output file arranged to control the position of the output element within the three-dimensional environment by controlling output of the one or more output devices. The time-stamping component may time-stamp the coordinates recorded by the recording component.

In one embodiment, the output element is a sound source in an immersive sound environment in which the output devices are speakers. Further features provide for the associating component to include: an amplitude determining component for determining speaker amplitude data based on time-stamped coordinates and output device location data; and a transmitting component for transmitting the speaker amplitude data to a renderer for output of the sound source by speakers so as to position the sound source within the three-dimensional environment; and for the associating component to associate the time-stamped coordinates with an audio object file, the audio object file including an audio signal of the sound source and optionally attributes of the sound source.

In another embodiment the output element is one of a light beam or focal point of one or more light beams in a theatrical environment in which the output devices are spot lights. A further feature provides for the associating component to map movement of the simulated output element to movement of the output devices, for the time-stamping component to generate time-stamped orientation coordinates of the output devices, and for the associating component to associate the time-stamped orientation coordinates of the output devices with a digital multiplex (DMX) signal.

The invention extends to a computer program product for positioning an output element within a three-dimensional environment including one or more output devices, the computer program product comprising a computer-readable medium having stored computer-readable program code for performing the steps of: obtaining movement data relating to movement of a mobile device; mapping the movement data to movement of a simulated output element in a virtual environment, the virtual environment simulating the three-dimensional environment; and associating the movement of the simulated output element with movement of an output element within the three-dimensional environment, so as to control the position of the output element within the three-dimensional environment by controlling output of the one or more output devices.

Embodiments of the invention will now be described, by way of example only, with reference to the accompanying drawings.

DETAILED DESCRIPTION WITH REFERENCE TO THE DRAWINGS

Systems and methods for positioning an output element within a three-dimensional environment are described herein. In one exemplary embodiment, the described systems and methods may be used to position an output element being a sound source in a three-dimensional, immersive sound environment. In a second exemplary embodiment, the described systems and methods may be used to position an output element being one of a light beam or focal point of one or more light beams in a three-dimensional theatrical environment. In the various embodiments described herein, movement data relating to movement of a mobile device may be obtained and used to position the output element within the three-dimensional environment.

In particular, the systems and methods described herein enable a user to control the real-time and/or recorded position and/or movement of an output element, such as a sound source or light projection, by manipulating the orientation of a mobile device.

Figure 1:
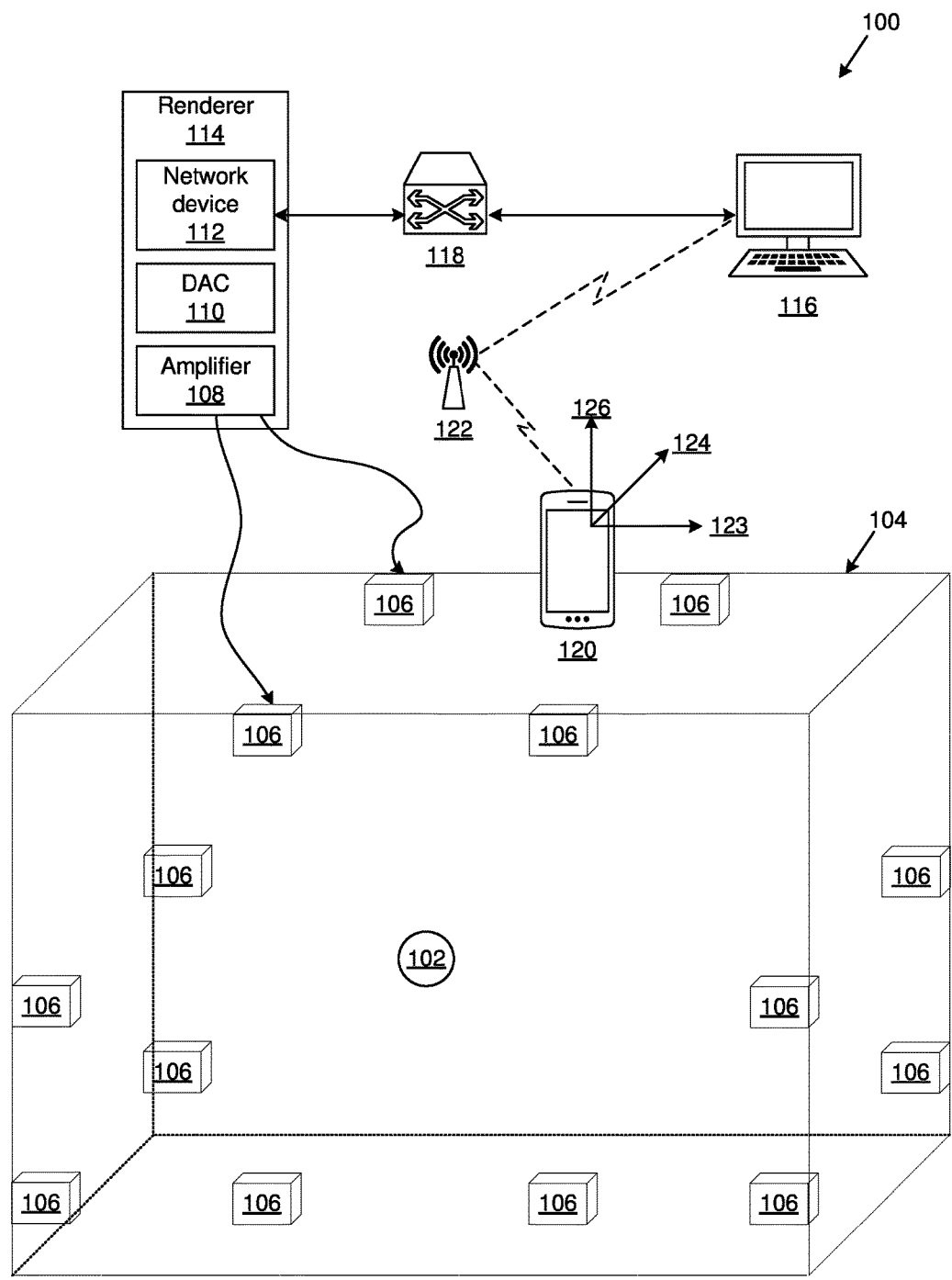
FIG. 1 is a schematic diagram which illustrates an exemplary system for positioning an output element within a three-dimensional environment according to one embodiment.

FIG. 1 is a schematic diagram which illustrates an exemplary system (100) according to one embodiment. The embodiment illustrated in FIG. 1 is a system (100) for positioning a sound source (102) in a three-dimensional environment (104), such as an immersive sound environment. The three-dimensional environment (104) includes a number of output devices configured to output the sound source which, in this embodiment, are speakers (106). Each one of the speakers (106) is connected to a multi-channel amplifier (108) (only two connections are illustrated in the Figure), which in turn is connected to a digital-to-analogue converter (DAC) (110). The DAC (110) is connected to a network device (112). Exemplary network devices include audio-visual bridging (AVB) devices (112) such as AVB-DG devices, audio over internet protocol (IP) devices, and the like, although any appropriate protocol may be utilised. The network device (112) may be any suitable device configured to implement time-sensitive network standards and communicates with the DAC (110) using integrated interchip sound (12S) or any other appropriate communication standard. Together, the amplifier (108), DAC (110) and network device (112) provide a renderer (114). It should be appreciated that although only one renderer (114) is illustrated in FIG. 1, in a practical implementation there may be more than one.

The renderer (114) is connected to a server computer (116) via a network switch (118). The server computer (116) may be any appropriate server computer or computing device which performs a server role. One or both of a Digital Audio Workstation (DAW) or a media centre may execute on the server computer. The DAW and/or media centre may provide a number of tracks, each of which corresponds to a sound source which may need to be positioned within the three-dimensional environment.

The system (100) further includes a mobile device (120) which may be any appropriate mobile electronic device such as a mobile phone, a tablet computer, a personal digital assistant, wearable computing device or the like. In this embodiment, the mobile device (120) is a mobile phone. The mobile device (120) has one or both of a gyroscope and an accelerometer for measuring movement of the mobile device (120) and generating movement data relating to the measured movement. A gyroscope may measure rotation of the mobile device (120) about one or more axes thereof while an accelerometer may measure acceleration of the mobile device along one or more axes thereof. The mobile device (120) is wirelessly connected to the server computer (116) via an appropriate wireless communication network (122), such as Wi-Fi™, and is configured to transmit and receive data and messages to and from the server computer (116).

The mobile device (120) is operable to obtain movement data relating to movement of the mobile device (120). In the exemplary embodiment illustrated, the movement data is rotation data relating to rotation of the mobile device about one or more of its x-axis (123), y-axis (124) and z-axis (126). The mobile device (120) is further operable to map the movement data, in this case being rotation data, to movement of a simulated sound source in a virtual environment which simulates the three-dimensional environment (104).

For example, a transformation function executable on the mobile device (120) may transform rotation data relating to rotation of the mobile device (120) about its x-axis (123) to linear movement of the simulated sound source along its y-axis. In this manner, the position of the simulated sound source in the virtual environment may be incrementally updated by rotating the mobile device about one or more axes thereof. Coordinates based on the position of the simulated sound source within the virtual three-dimensional environment (104) may be recorded and time-stamped, either by the mobile device (120) or the server computer (116).

The time-stamped coordinates of the simulated sound source may be used by the server computer (116) for generating an audio object file. The time-stamped coordinates of the simulated sound source are usable by the server computer (116) and renderer (114) to place and/or move the sound source (102) within the three-dimensional environment (104).

Using a mobile device to position and/or move the sound source within the three-dimensional environment is advantageous as a user can simultaneously manipulate the position of the sound source along all three axes rather than, for example, having to manipulate movement in an x-y and y-z planes separately. Furthermore, the user can roam within the environment (104) while using the mobile device (120) to position the sound source (102).

Figure 2:
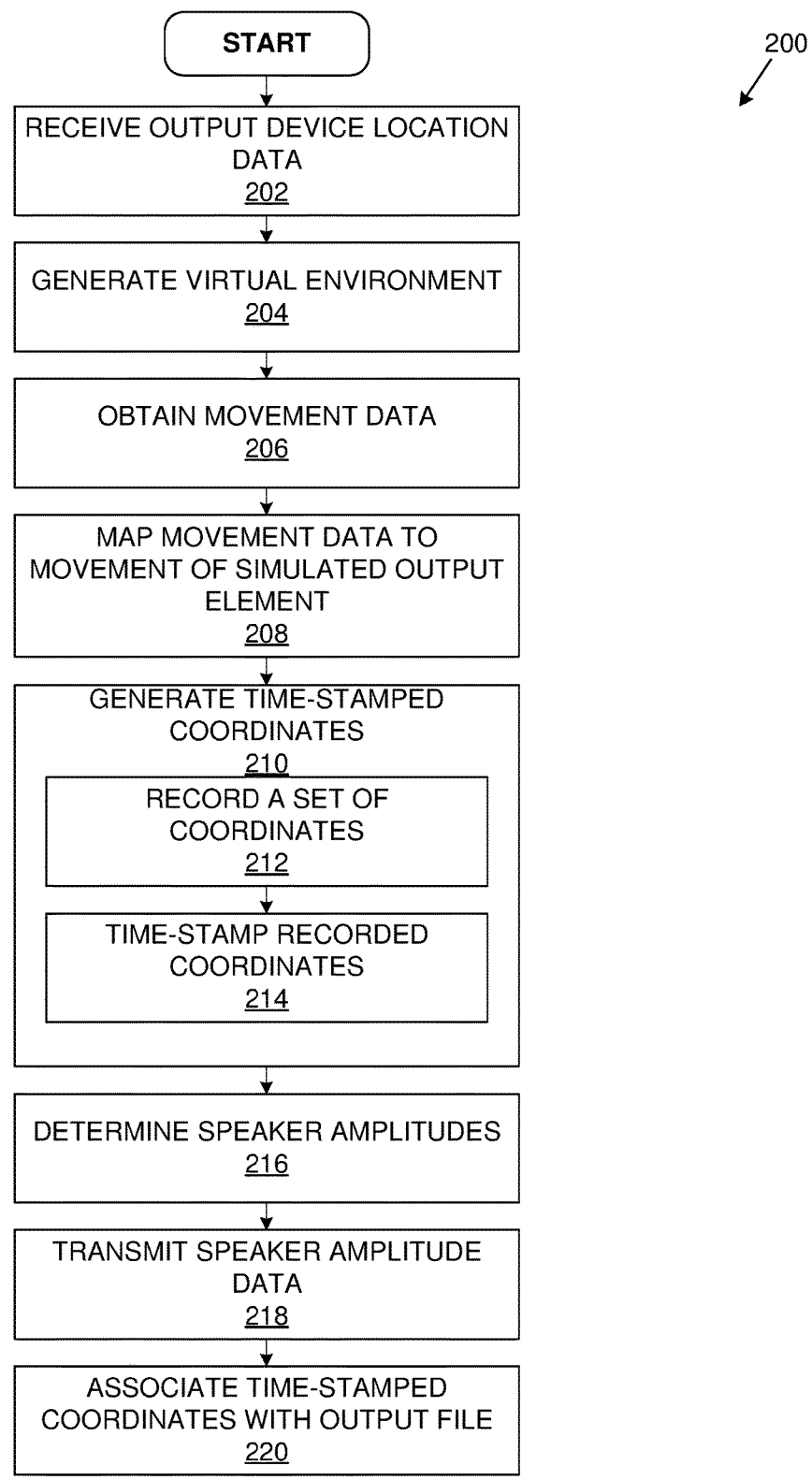
FIG. 2 is a flow diagram which illustrates an exemplary method for positioning an output element within a three-dimensional environment.

FIG. 2 is a flow diagram which illustrates an exemplary method (200) for positioning an output element within a three-dimensional environment. The method may be implemented by the systems described herein (such as that described above with reference to FIG. 1) in which a sound source is positioned within a three-dimensional immersive sound environment.

Output device location data relating to locations of the one or more output devices in the environment is received (202). In this embodiment, the one or more output devices are speakers within an immersive sound environment and the output device location data relates to coordinates of the speakers within the environment.

A virtual environment including one or more simulated output devices and a simulated output element is generated (204). The simulated output element is a simulated sound source. The virtual environment simulates the three-dimensional environment. The generated virtual environment can then be displayed on a display of a mobile device.

Movement data relating to movement of the mobile device is obtained (206). This may include obtaining movement data from one or both of an accelerometer and a gyroscope of the mobile device. In the illustrated embodiment, obtaining (206) movement data includes obtaining rotation data relating to rotation of the mobile device around an axis thereof.

The movement data, in this embodiment being rotation data, is mapped (208) to movement of the simulated sound source in the virtual environment. Mapping (208) movement data includes transforming the rotation data to linear movement of the simulated output element along a corresponding axis thereof.

Time-stamped coordinates based on a position of the simulated output element in the virtual environment are generated (210). In this embodiment, generating (210) time-stamped coordinates includes periodically recording (212) a set of coordinates of the position of the simulated output element and time-stamping (214) each set of coordinates. In another embodiment, each set of coordinates may be time stamped as it is recorded.

In the present embodiment, speaker amplitudes, based on the time-stamped coordinates and the output device location data, are determined (216). This may include performing any suitable sound localization algorithm, such as vector based amplitude panning, distance-based amplitude panning and the like, so as to determine sound source amplitudes which should be output at each speaker. In this manner, the sound source can be made to appear to a listener to be emanating or originating from a position corresponding to that of the simulated sound source in the virtual environment.

The speaker amplitude data is transmitted (218) to the renderer, in some embodiments as matrix cross-point data, such that the sound source may be output by the speakers. Thus, near real-time control of a sound source's location using the mobile device may be enabled. A user may position him- or herself in the three-dimensional environment and control the position and/or movement of a selected sound source within the three-dimensional environment using the mobile device.

The time-stamped coordinates are associated (220) with an output file, in this embodiment being an audio object file. The audio object file includes the audio signal of the sound source as well as the time-stamped coordinates such that the sound source may be repeatedly output by speakers within the three-dimensional immersive sound environment so as to appear to a listener to be positioned at or emanating from the previously set position at a corresponding point in time.

Depending on the configuration of the system, the various operations, processes, steps, etc. of the method described above may be performed by either the server computer (116) or the mobile device (120). For example, the mobile device may simply make movement data available to the server computer (116), with most of the processing being done by the server computer (116). Alternatively, the mobile device may perform the most of the operations.

Figure 3:
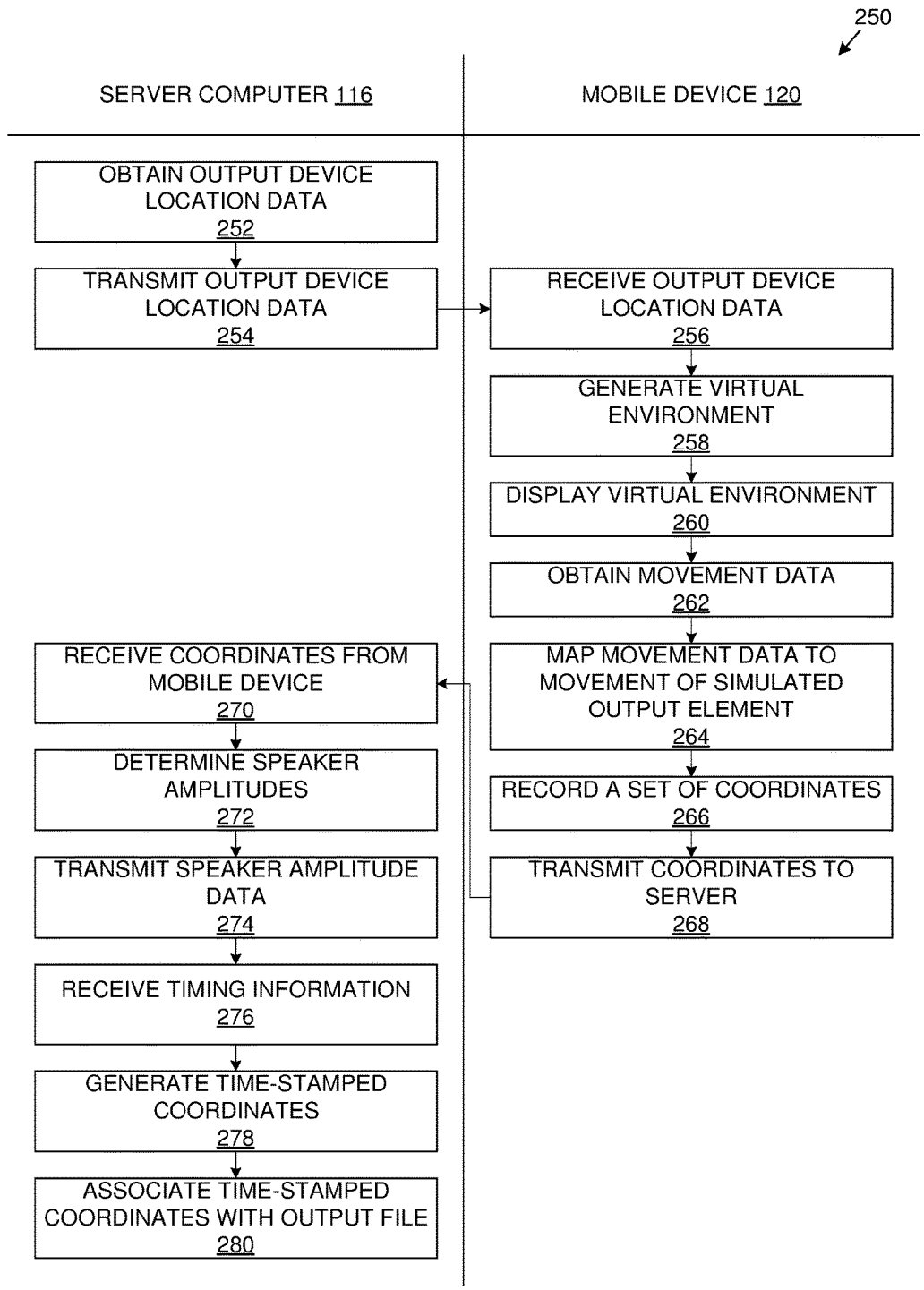
FIG. 3 is a swim-lane flow diagram which illustrates an exemplary method for positioning an output element within a three-dimensional environment.

FIG. 3 is a swim-lane flow diagram which illustrates an exemplary method (250) for positioning an output element within a three-dimensional environment in which respective swim-lanes delineate functions or operations performed by respective devices. As mentioned above, it should be appreciated that such delineation is exemplary and in other embodiments the operations or functions performed by respective devices may differ.

The server computer (116) obtains (252) output device location data relating to locations of the one or more output devices in the three-dimensional environment and transmits (254) the output device location data to the mobile device (120). The mobile device (120) receives (256) the output device location data. In this embodiment, the one or more output devices are speakers within an immersive sound environment and the output device location data includes a set of coordinates of the speakers within the immersive sound environment.

The mobile device (120) generates (258) a virtual environment including one or more simulated output devices and a simulated output element. The simulated output element is a simulated sound source and the virtual environment simulates the three-dimensional environment. The simulated output element indicates the position in the environment from which a sound source will appear to emanate. The simulated output devices correspond to the output devices and are located within the simulated environment at locations which correspond with (e.g. which are appropriately scaled relative to) those of the output devices. The generated virtual environment is then displayed (260) on a display of the mobile device.

Movement data relating to movement of the mobile device (120) is obtained (262). This may include obtaining movement data from one or both of an accelerometer and a gyroscope of the mobile device (120). In the illustrated embodiment, obtaining (262) movement data includes obtaining rotation data relating to rotation of the mobile device around an axis thereof. The movement of the mobile device relates to movement by a user wishing to control the position of an output element and is thus a form of user input.

The movement data, in this embodiment being rotation data, is mapped (264) to movement of the simulated sound source in the virtual environment. Mapping (264) movement data may include transforming the rotation data to linear movement of the simulated output element along a corresponding axis thereof. In other embodiments, acceleration data may be mapped to movement of the simulated sound source in the virtual environment.

The mobile device (120) records (266) a set of coordinates of the updated position of the simulated output element. The coordinates correspond to the location of the simulated output element within the virtual environment and may be recorded each time the simulated sound source is moved or periodically as it is moved.

The mobile device (120) periodically transmits (268) the recorded coordinates to the server computer (116). The coordinates may be transmitted together with an indication of the DAW track (which corresponds to the sound source) to which they apply. In the present embodiment, the coordinates are transmitted to the server computer (116) via the communication network together with an indication of the DAW track to which the coordinates apply. The coordinates may be transmitted whenever the simulated sound source is moved within the virtual environment. As mentioned above, movement of the mobile device is controlled by a user, either by adjusting the orientation of the mobile device, or by moving a representation of the simulated sound source on the touch screen of the mobile device, or a combination of both.

The server computer (116) receives (270) the coordinates and track number.

The server computer (116) may determine (272) speaker amplitudes, based on the received coordinates, track number and the output device location data. This may include using an appropriate algorithm (e.g. by performing distance-based amplitude panning) so as to determine sound source amplitudes which should be output at each speaker. In this manner, the sound source can be made to appear to a listener to be emanating or originating from a position corresponding to that of the simulated sound source in the virtual environment. The server computer (116) may maintain a record of the current position of the track in memory.

The speaker amplitude data is transmitted (274) to the renderer (114), in some embodiments as matrix cross-point data, such that the sound source may be output by the output devices, being speakers in this embodiment. Thus, near real-time control of a sound source's location by manipulating the orientation of the mobile device may be enabled. A user may position him- or herself in the three-dimensional environment and control the position and/or movement of a selected sound source within the three-dimensional environment using the mobile device.

It should be appreciated that in this manner, localization of any channel in the three-dimensional environment may be performed by controlling orientation of the mobile device (120). The speakers (106) may be used to position a sound source, derived from a channel (a particular track in a DAW or media centre) within the three-dimensional environment in near real-time. The sound source, which may be termed a "virtual sound source" in this case, is thus controlled by manipulating the orientation of the mobile device (120) so as to appear to a listener to be positioned at or emanating from various points within the three-dimensional environment.

At this stage it should be appreciated that the systems and methods described herein may be used simply to control the positioning of a sound source within a three-dimensional environment in real-time. Such an implementation may be provided with a multi-channel media centre in place of the DAW. The media centre application may only facilitate localization of sound sources in real-time, and not the recording of coordinates for later playback of the sound source.

Returning now to FIG. 3, the method may continue to provide time-stamped coordinates which can be associated with the sound source in an output file for later playback. The server computer (116) may also receive (276) timing information. The timing information may, for example, be MIDI Time Code (MTC) messages which are received from the DAW. The MTC messages may be sent from the DAW every quarter frame, where the frame rate used is 30 frames/sec. When in a record mode, the server computer (116) may generate (278) time-stamped coordinates by, upon receiving the latest MTC message, associating the current coordinate values for each track with the MTC message and saving this data at the end of the track's list. This may only be done if the coordinates have changed. The server computer (116) may also maintain a list of time-stamped coordinates in volatile memory for each track.

The time-stamped coordinates may be associated (280) with an output file. In some embodiments, the output file may be an audio object file. Associating time-stamped coordinates with an output file may enable the sound source to be repeatedly (i.e. at later points in time) output by speakers within the three-dimensional immersive sound environment so as to appear to a listener to be positioned at or emanating from the previously set position at a corresponding point in time. The time-stamped coordinates may only be associated with an output file upon receiving an instruction from the user to do so.

In some implementations, the audio object file may be a sound file (e.g. a .wav file) including the audio signal of the sound source. Associating time-stamped coordinates with an output file may include associating an audio object file with a coordinate metadata file. The coordinate metadata file may contain the time-stamped coordinates as well as an indication of the track within the DAW (i.e. a pointer to the relevant audio object file of the relevant track corresponding to the sound source). Such a coordinate metadata file may be created for each sound source, with entries that include track data and lists of time-stamped coordinates.

In some implementations, the coordinate metadata file may be provided in the form of an XML file, an example of which is given below:

```
<immersiveControl>
<track TrackNumber="0"/><track TrackNumber="1">
    <timedCoord MTC="0"
        xCoord="0" yCoord="0" zCoord="0"/>
    <timedCoord MTC="262"
```

```
            xCoord="-28.260292164674635"yCoord="189.6060203629925"
        zCoord="165"/>
    <timedCoord MTC="268"
            xCoord="-49.79194333776007" yCoord="196.3346613545817"
        zCoord="165"/>
    <timedCoord MTC="272"
            xCoord="-60.557768924302785" yCoord="189.6060203629925"
        zCoord="165"/>
    <timedCoord MTC="274"
            xCoord="-67.28640991589198" yCoord="178.84019477644978"
        zCoord="165"/>
    <timedCoord MTC="276"
            xCoord="-69.97786631252767" yCoord="166.72864099158923"
        zCoord="165"/>
    <timedCoord MTC="278"
            xCoord="-72.66932270916334" yCoord="157.30854360336434"
        zCoord="165"/>
</track>
<track TrackNumber="2"/>
<track TrackNumber="3"/>
<track TrackNumber="4"/>
<track TrackNumber="5"/>
<track TrackNumber="6"/>
<track TrackNumber="7"/>
</immersiveControl>
```

In some implementations, associating time-stamped coordinates with an output file may include providing an associating file which associates an output file (e.g. audio object file) with a coordinate metadata file. Exemplary audio object files include the Multi-Dimensional Audio (MDA) output file associated with DTS, Inc. sound systems, files recognisable by the Atmos® system from Dolby Laboratories, Inc, and the like. In further implementations, associating time-stamped coordinates with an output file may include writing the time-stamped coordinates to the audio object file.

Figure 4:
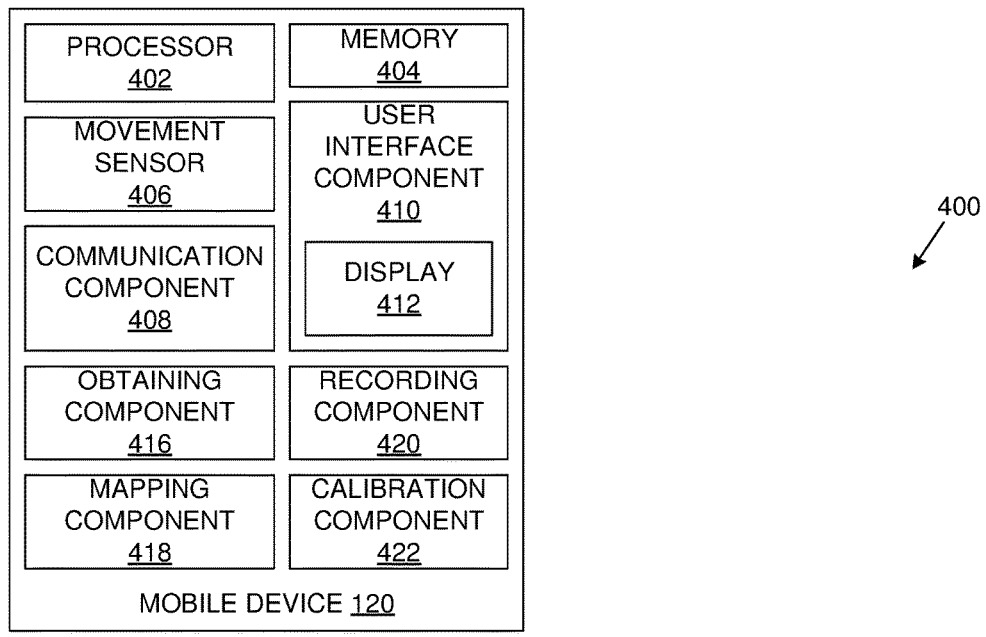
FIG. 4 is a block diagram which illustrates components of an exemplary system for positioning an output element within a three-dimensional environment.

FIG. 4 is a block diagram which illustrates components of an exemplary system (400) for performing the steps or operations of the methods described above.

The mobile device (120) may include a processor (402) for executing the functions of components described below, which may be provided by hardware or by software units executing on the mobile device (120). The software units may be stored in a memory component (404) and instructions may be provided to the processor (402) to carry out the functionality of the described components. In some cases, software units arranged to manage and/or process data on behalf of the mobile device (120) may be provided remotely (e.g. by the server computer). Some or all of the components may be provided by a software application downloadable onto and executable on the mobile device (120).

The mobile device (120) includes a movement sensor (406) for sensing movement of the mobile device. In the illustrated embodiment, the movement sensor (406) is a three-axis gyroscope which is built into the mobile device (120). In other embodiments, the movement sensor (406) may include a three-axis accelerometer. The movement sensor (406) senses movement of the mobile device (120) and generates movement data relating to the sensed movement.

The mobile device (120) includes a communication component (408) for transmitting and receiving messages and data to and from the server computer (116). The messages and data may, for example, be hypertext transfer protocol (http) 'get' and 'request' messages which are transmitted and received in TCP/IP packets via the communication network. The communication component (408) is operable to transmit a request for and to receive output device location data relating to locations of the one or more output devices, being speakers in this embodiment, in the three-dimensional environment. In this exemplary embodiment, the output device location data may be received in an XML file having the output device location data therein. An exemplary XML file, which may also include media access control (MAC) addresses of the renderers, is shown below:

```
<?xml version="1.0" encoding="UTF-8"?>
<configuration>
    <renderer macadr = "12:22:5a:27:44:ac">
        <speaker number = "1" xpos = "0" ypos = "0" zpos = "150"
        position = "front"> </speaker>
        <speaker number = "2" xpos = "-220" ypos = "30" zpos =
        "150" position = "front"> </speaker>
        <speaker number = "3" xpos = "220" ypos = "30" zpos = "150"
        position = "front"> </speaker>
        <speaker number = "4" xpos = "-220" ypos = "320" zpos =
        "150" position = "side"> </speaker>
        <speaker number = "5" xpos = "220" ypos = "320" zpos =
        "150" position = "side"> </speaker>
        <speaker number = "6" xpos = "-190" ypos = "0" zpos = "250"
        position = "front"> </speaker>
        <speaker number = "7" xpos = "190" ypos = "0" zpos = "250"
        position = "front"> </speaker>
    </renderer>
```

```
<renderer macadr = "12:22:5a:27:44:ad">
    <speaker number = "1" xpos = "-220" ypos = "200" zpos =
    "200" position = "side"> </speaker>
    <speaker number = "2" xpos = "220" ypos = "200" zpos = "200"
    position = "side"> </speaker>
</renderer>
</configuration>
```

The communication component (408) may also be configured to transmit coordinate data to the server computer (116) and transmit and receive DAW-related information, such as a selected track, etc.

The mobile device (120) further includes a user interface component (410) for interacting with a user. The user interface component (410) includes a touch-sensitive display (412) and is operable to generate a virtual environment simulating the three-dimensional environment. The virtual environment includes simulated output devices, at locations corresponding to the locations of the output devices received from the server computer (116), and a simulated sound source. The virtual environment is displayed on the display screen (412). The user interface component (410) is also operable to present various DAW controls on the display (412) with which a user can control the DAW executing on the server computer (116), for example, to select sound sources, control the playback of sound sources, receive time code messages and the like.

The mobile device (120) also includes an obtaining component (416) for obtaining movement data relating to movement of the mobile device from the movement sensor (406) and a mapping component (418) for mapping the movement data to movement of the simulated sound source.

The mapping component (418) is operable to apply a transformation function to the movement data, being rotation data relating to rotation of the mobile device (120) about an axis thereof in this embodiment, so as to transform the rotation data to linear movement of the simulated sound source along a corresponding axis. The mapping component (418) is further operable to update the position of the simulated sound source within the virtual environment. The updated position of the simulated sound source is presented on the display (412).

The mobile device includes a recording component (420) for periodically recording a set of coordinates based on the position of the simulated sound source within the virtual environment. The set of coordinates may be transmitted to the server computer (116) via the communication component (408).

In some embodiments, the mobile device (120) may include a calibration component (422) for calibrating the positioning of the simulated sound source. For example, the calibration component (422) may assign the position of the mobile device (for example the mobile device's orientation about the z-axis) as corresponding to the simulated sound source's mid-point along the y-axis. Deviations of the mobile device's position in relation to this assigned position can then be mapped to movement of the simulated sound source in the virtual environment.

The server computer (116) may include a processor (426) for executing the functions of components described below, which may be provided by hardware or by software units executing on the server computer (116). The software units may be stored in a memory component (428) and instructions may be provided to the processor (426) to carry out the functionality of the described components. In some cases, software units arranged to manage and/or process data on behalf of the server computer (116) may be provided remotely (e.g. by a cloud-based server computer, etc.).

The server computer (116) may have a DAW software application (430) executing thereon which provides a number of sound sources. The DAW software application (430) is at least partially controllable by the mobile device, in some embodiments through musical instrument digital interface (MIDI) messages.

The server computer (116) further includes a communication component (432) which is operable to transmit and receive messages and data to and from the mobile device (120). The messages and data may, for example, be hypertext transfer protocol (http) 'get' and 'request' messages which are transmitted and received in TCP/IP packets via the communication network. The communication component (432) is operable to receive a request for and to transmit output device location data relating to locations of the one or more output devices to the mobile device (120). The output device location may be transmitted to the mobile device in an XML file. The communication component (432) is further operable to receive the set of coordinates relating to the position of the simulated sound source from the mobile device (120).

The server computer (116) includes an associating component (434) arranged to associate the movement of the simulated output element with movement of an output element within the three-dimensional environment so as to control the position of the output element within the three-dimensional environment. The control may be real-time control of the position of the output element within the three-dimensional environment or may be in the form of a set of instructions saved in an output file for subsequent access and control of the position of the output element within the three-dimensional environment.

The associating component (434) may also include a time-stamping component (436) for time-stamping the received set of coordinates to generate time-stamped coordinates which are based on a position of the simulated sound source in the virtual environment at that point in time. In some embodiments, the time-stamping component (436) utilises an external clock, such as a MTC or Society of Motion Picture and Television Engineer (SMPTE) time code, which generates a message every quarter frame.

The associating component (434) may be arranged to associate the time-stamped coordinates with an output file, such as an audio object file associated with the sound source. Associating the time-stamped coordinates with an output file may include writing the time-stamped coordinates to a coordinate metadata file and associating the coordinate metadata file with a corresponding audio object file associated with the sound source. The coordinate metadata file and the audio object file may then be used by the server computer to output a sound source within the environment, the output sound source appearing to a listener within the environment to be positioned or to be moving as was directed using the mobile device (116).

The associating component (434) may further include an amplitude determining component (438) for determining speaker amplitudes based on the on time-stamped coordinates and the output device location data. The amplitude determining component (438) may perform any suitable sound localization algorithm, such as distance-based amplitude panning, vector based amplitude panning, etc., so as to determine sound source amplitudes which should be output at each speaker. The distance-based amplitude panning may be performed using the inverse square law, inverse distance law or any other appropriate algorithm.

The associating component (434) may include a transmitting component (440) for transmitting the speaker amplitude data to the renderer. The speaker amplitude data may be transmitted to the renderer as matrix cross-point data (e.g. AVB Discovery, Enumeration, Connection management and Control (AVDECC) mixer matrix cross-point values) such that the sound source may be output by the speakers in such a manner that the sound source appears, to a listener within the environment, to be positioned or to move in accordance the simulated sound source being displayed on the mobile device (120).

It should be appreciated that the system (400) described above with reference to FIG. 4 is exemplary, and modifications or alterations may be incorporated without departing from the scope of the invention. For example, in one alternative embodiment, the mobile device may time-stamp the coordinates and transmit time-stamped coordinates to the server computer. In another alternative embodiment, the mobile device may transmit the movement data relating to the sensed movement to the server computer which may then map the movement data to movement of a simulated sound source and generate time-stamped coordinates based on the position of the simulated sound source.

Figure 5:
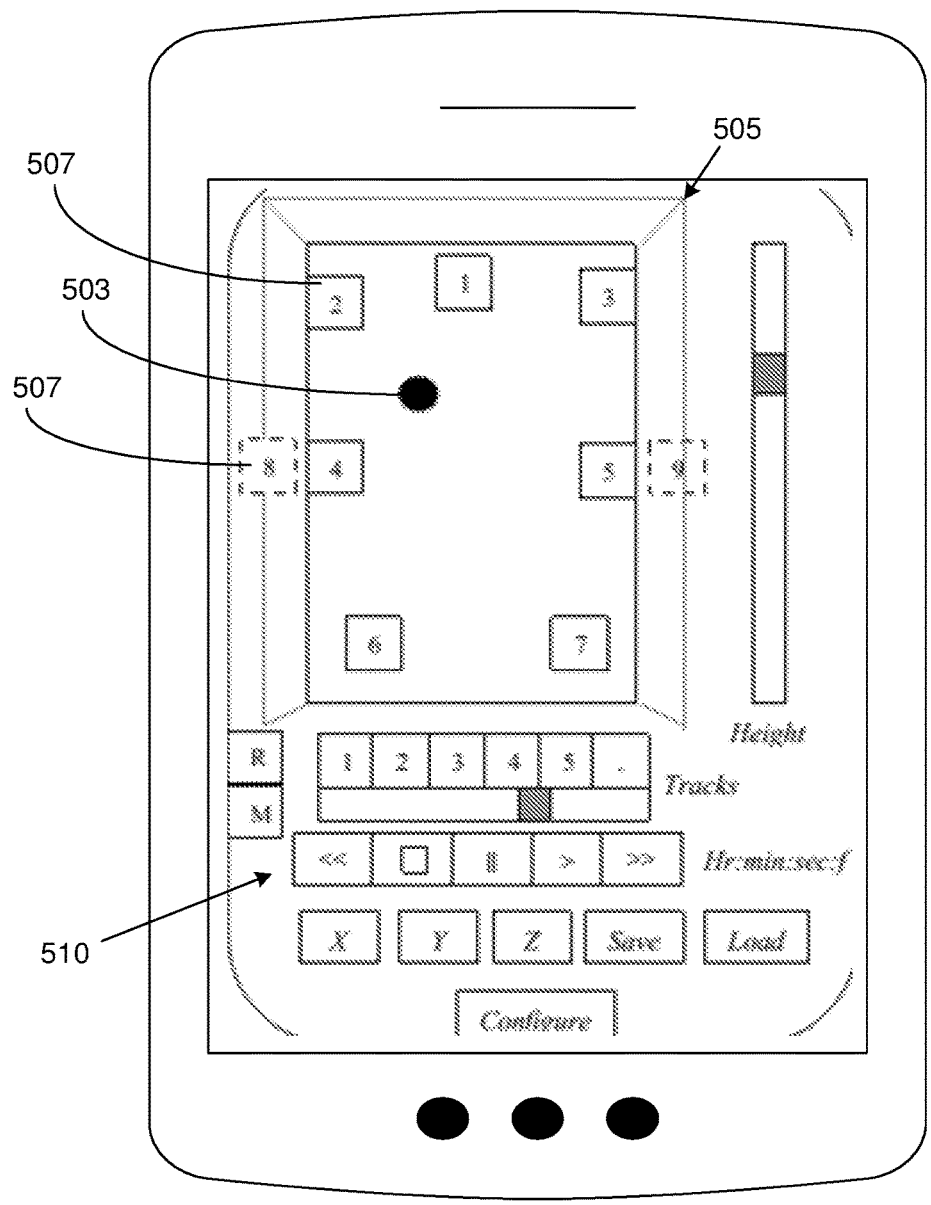
FIG. 5 is a schematic diagram which illustrates an exemplary virtual environment generated by a mobile device and being displayed on a display thereof.

FIG. 5 is a schematic diagram which illustrates an exemplary virtual environment generated by a mobile device (120) and being presented on a display thereof. The virtual environment (505) simulates an actual three-dimensional environment, such as the three-dimensional environment (104) illustrated in FIG. 1. The virtual environment (505) includes a plurality of simulated output devices (507), in this embodiment being simulated speakers at locations within the virtual environment corresponding to the locations of the speakers in the actual three-dimensional environment. In the exemplary virtual environment (505), simulated output devices (507) being higher up are illustrated in dashed lines and are positioned outwards from lower down simulated output devices (507), so as to give an impression of height. The virtual environment further includes a simulated output element, in this case being a simulated sound source (503). Various DAW controls (510) are also presented on the display. The DAW controls (510) enable a user to select sound sources, control the playback of sound sources, view time code data and the like.

The systems and methods described above thus enable a user to position a sound source within a three-dimensional environment, such as an immersive sound environment, using a mobile device. The described systems and methods may be used to control the position, or to move a sound source within the three-dimensional environment in near real-time, i.e. with minimal or no delay, so as to enable a sound engineer or other user to experiment with various positions and/or movements of the sound source within the environment. Furthermore, the described systems and methods may enable the user to generate an audio object file including an audio signal of the sound source and having time-stamped three-dimensional coordinates corresponding to the position of the sound source associated therewith.

Figure 6:
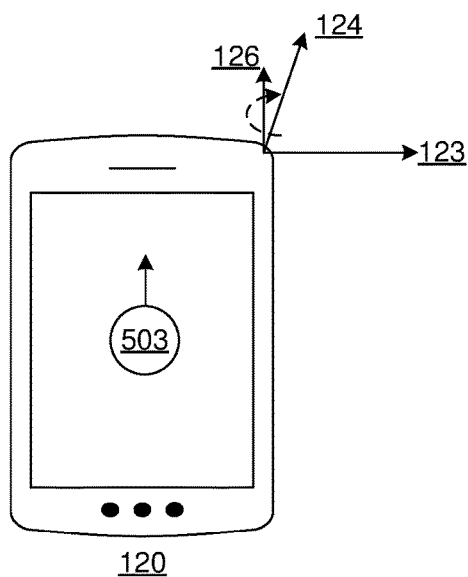
FIG. 6 is a schematic diagram which illustrates an exemplary in-use scenario of the described systems and methods in which the mobile device is rotated about its z-axis.
Figure 7:
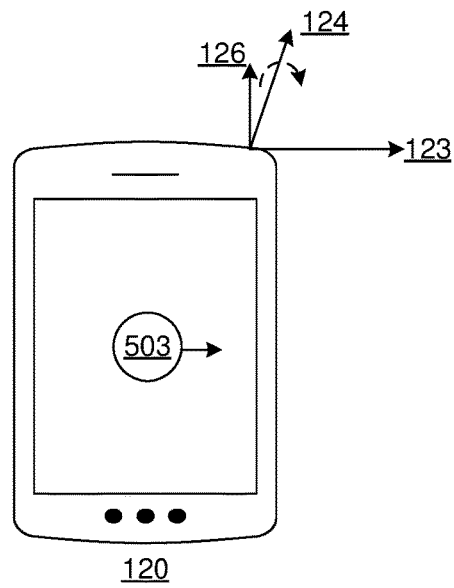
FIG. 7 is a schematic diagram which illustrates an exemplary in-use scenario of the described systems and methods in which the mobile device is rotated about its y-axis.
Figure 8:
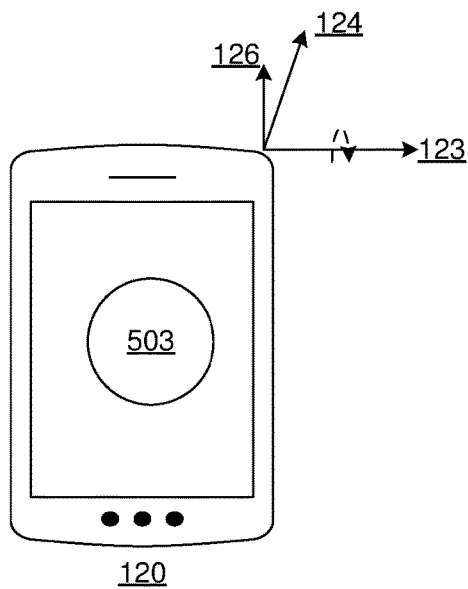
FIG. 8 is a schematic diagram which illustrates an exemplary in-use scenario of the described systems and methods in which the mobile device is rotated about its x-axis.

FIGS. 6 to 8 illustrate an exemplary in-use scenario of the systems and methods described above, as experienced by a user of the mobile device (120). In the exemplary use-case, FIG. 6 illustrates rotation of the mobile device (120) about the z-axis (126) being mapped to movement of the simulated sound source (503) along the y-axis (124). FIG. 7 illustrates rotation of the mobile device (120) about the y-axis (124) being mapped to movement of the simulated sound source (503) along the x-axis (123). FIG. 8 then illustrates rotation of the mobile device (120) about the x-axis (123) being mapped to movement of the simulated sound source (503) along the z-axis (126). Movement of the simulated sound source along the z-axis is illustrated by either enlarging or reducing the size of the simulated sound source or displaying a bounding rectangle at the current height. In other exemplary scenarios, rotation about one axis may be transformed to movement along another axis.

It should also be appreciated that in other embodiments, movement of the mobile device along one axis may be mapped to movement of the simulated sound source along that or another axis. In some cases, a combination of movement and rotation may be utilised to control the position of the simulated sound source, and in turn, the actual sound source. It is further anticipated that movement of the simulated sound source along one or more axes may be controlled using the touch-sensitive display screen of the mobile device. For example, a user may use his or her finger to move the simulated sound source in the x-y-plane, while rotating or moving the mobile device to control movement of the simulated sound source, and in turn the actual sound source, along the z-axis.

In other implementations, the user may control movement of the simulated output element in the x-y plane by walking with the mobile device in the three-dimensional environment. The user's position within the environment may be mapped to a position within the virtual environment. Whilst walking within the three-dimensional environment, the simulated output element may move within the virtual environment to positions corresponding to the user's position within the three-dimensional environment. Control of the movement of the simulated output element in the y-z plane may be effected by rotating the mobile device about a particular axis as the user moves through the environment.

As mentioned above, in another embodiment, a system for positioning a sound source in a three-dimensional environment may be provided which includes a media centre, such as JRiver™ media centre, and a multi-DAC, such as the U-DAC8 from miniDSP™. The media centre may execute on a server computer. In this embodiment, the mobile device is configured to obtain movement data relating to movement of the mobile device, map the movement data to movement of a simulated output element in a virtual environment (which simulates the three-dimensional environment), record a set of coordinates based on the position of the simulated output element within the virtual environment, and, transmit the set of coordinates to the server computer. The server computer may in turn receive the coordinates and track number and determine speaker amplitudes, based on the received coordinates, track number and output device location data (e.g. positions of the speakers within the three-dimensional environment). The server computer may transmit the speaker amplitude data to a renderer such that the sound source may be output by the speakers.

Accordingly channel localization of any channel within the three-dimensional environment, the muting or gain thereof, as well as the movement of any channel within the environment, may be controlled by manipulating the orientation of the mobile device. In some instances, timing messages may be received from the media centre which may enable the localizations/movements of the channel to be recorded. Accordingly, a user is not constrained by the predetermined channel localization, but can position channels wherever desired within the three-dimensional environment, at whatever level required by way of an intuitive and mobile control means. The user is not constrained by the position of a control console but may roam within the three-dimensional environment. Further, multiple users, each having a mobile device, may control the positioning of channels within the environment.

Figure 9:
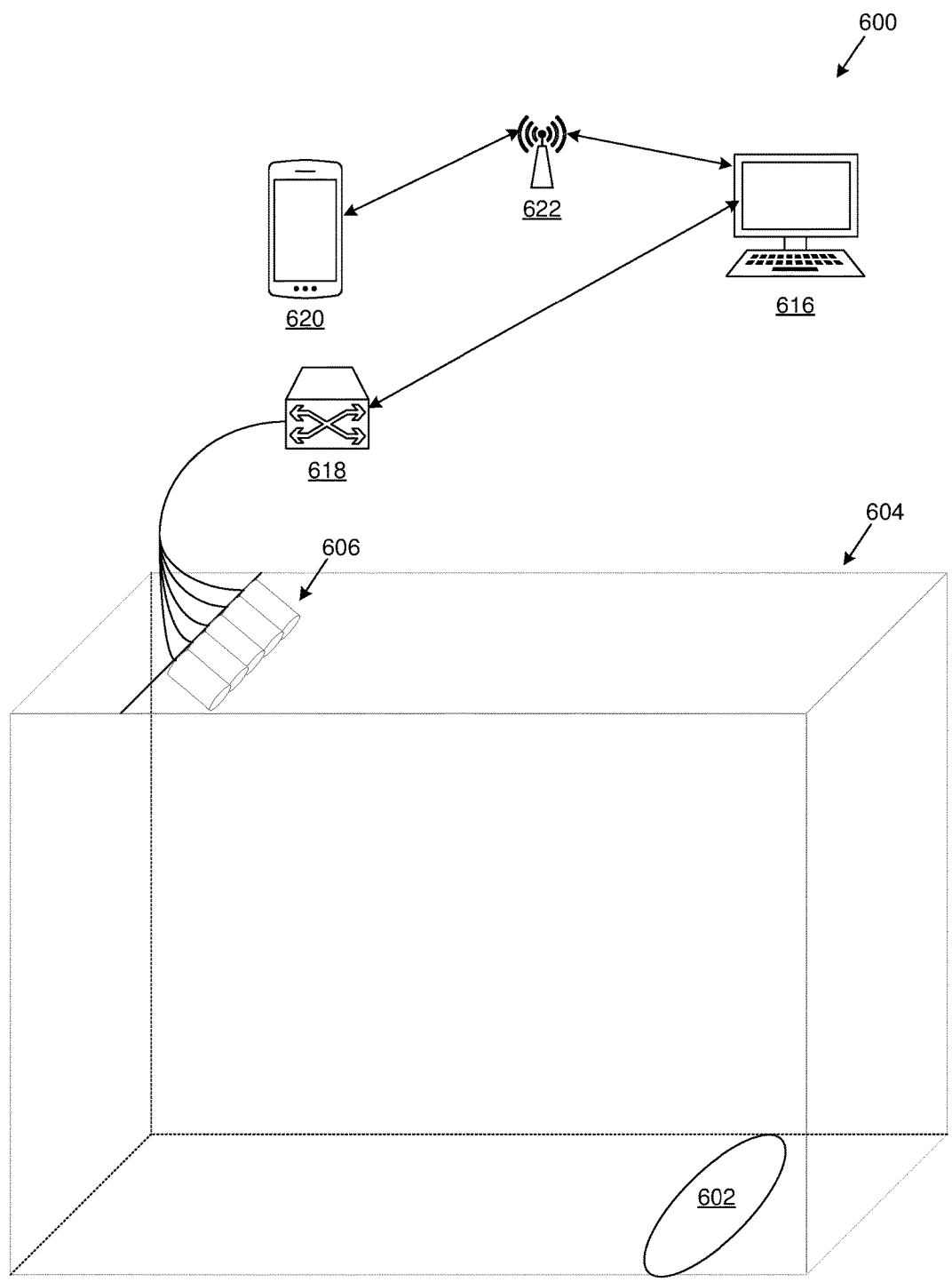
FIG. 9 is a schematic diagram which illustrates a system for positioning an output element within a three-dimensional environment according to a second embodiment.

Referring now to FIG. 9, in which a schematic diagram illustrating a system (600) for positioning an output element within a three-dimensional environment according to a second embodiment is shown. In this embodiment, the output element is a focal point of a number of light beams (602) in a theatrical environment (604). The term "focal point" as used herein should be broadly interpreted to include "a point of convergence of light" and to extend to "a zone on surface illuminated by a light beam". The focal point (602) is output by output devices being spot lights (606). The spot lights (606) may be any appropriate controllable spot lights, such as digital multiplex (DMX) controllable spot lights. This embodiment is similar to those described above, and various aspects of the preceding disclosure, including FIGS. 1 to 8 and their corresponding descriptions, may apply mutatis mutandis to the embodiment described below with reference to FIG. 9.

The system (600) further includes a server computer (616) which is connected to the spot lights (606) via an appropriate interface device (618). The system also includes a mobile device (620) which is operable to communicate with the server computer (616) via an appropriate wireless communication network (622). Although only one mobile device is illustrated, it should be appreciated that a plurality of mobile devices may be provided, each of which being operated by an operator and being used to control different spotlights within the theatrical environment (604).

Movement data obtained from the mobile device (620) may be mapped to movement of the output element, in this embodiment being focal point of a number of light beams (602). This may include initially mapping movement of the mobile device (620) to movement of a simulated focal point in a virtual environment and generating time-stamped coordinates based on the position of the simulated focal point in the virtual environment.

In some embodiments, the generated time-stamped coordinates may in fact be coordinates relating to the orientation of the spot lights (606), for example spherical coordinates (such as tilt and swivel), corresponding to a desired position of the light projection (602). In other embodiments, the coordinates may be the coordinates of the simulated light projection (602) within the virtual environment which may then be mapped to spherical coordinates in order to control orientation of the spot lights (606).

The time-stamped coordinates, being either time-stamped coordinates of the orientation of the spot lights (606) or time-stamped coordinates of the simulated light projection within the virtual environment are then associated with an output file. The output file, containing the time-stamped coordinates, can be used to generate appropriate pan and tilt commands for an Application Programming Interface (API). The API may communicate with a DMX driver. The DMX driver and its associated hardware may be arranged to generate the appropriate DMX 512 signalling for controlling the spot lights and, in turn, controlling the position and/or movement of the light projection (602) within the environment (604). The DMX signals may also be saved for light scene set-up purposes.

Thus, systems and methods described herein may permit a user to control spot lights or other similar output devices by manipulating the orientation of a mobile device. The described systems and methods may allow a user to roam while configuring light scenes, the user being able to manipulate the spot lights from within the environment using the mobile device. Furthermore, problems associated with translations required on the part of the user when controlling spot lights using a conventional slider or screen display to control the motion of the light may be alleviated. Using movement data of a mobile device to control orientation of spot lights and movement of a light projection may provide a more intuitive means of control over existing (e.g. console-based) solutions.

Figure 10:
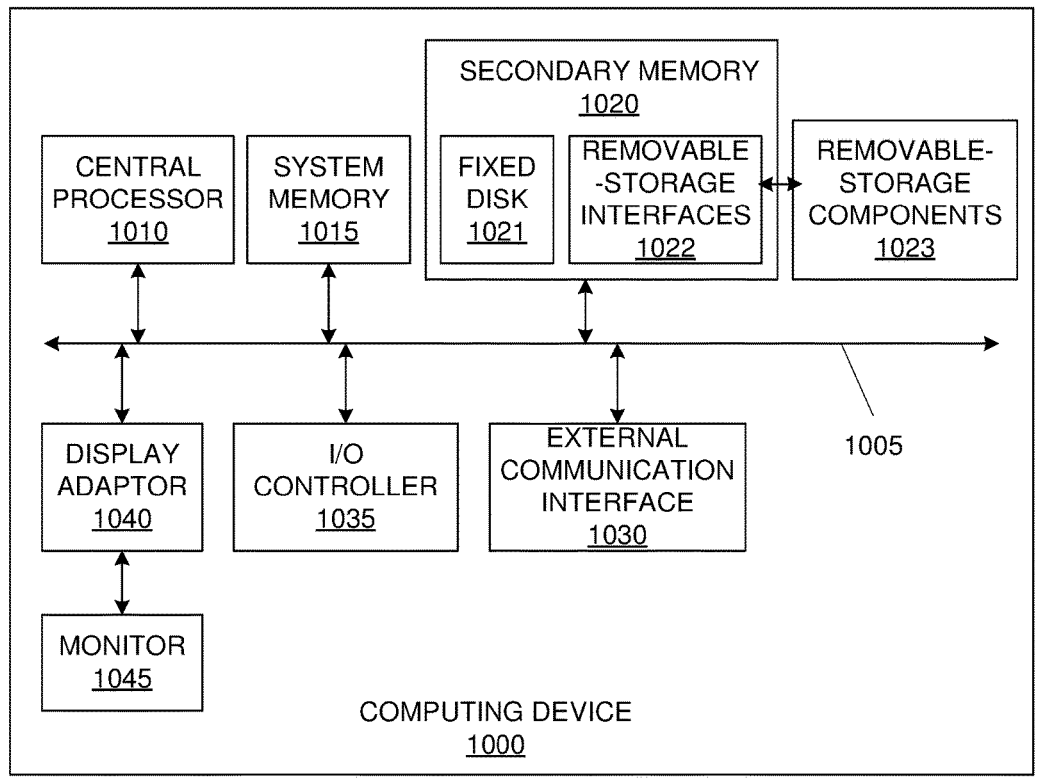
FIG. 10 illustrates an example of a computing device in which various aspects of the disclosure may be implemented.

FIG. 10 illustrates an example of a computing device (1000) in which various aspects of the disclosure may be implemented. The computing device (1000) may be suitable for storing and executing computer program code. The various participants and elements in the previously described system diagrams, for example the server computer (116, 616), may use any suitable number of subsystems or components of the computing device (1000) to facilitate the functions described herein. The computing device (1000) may include subsystems or components interconnected via a communication infrastructure (1005) (for example, a communications bus, a cross-over bar device, or a network). The computing device (1000) may include one or more central processors (1010) and at least one memory component in the form of computer-readable media. In some configurations, a number of processors may be provided and may be arranged to carry out calculations simultaneously. In some implementations, a number of computing devices (1000) may be provided in a distributed, cluster or cloud-based computing configuration and may provide software units arranged to manage and/or process data on behalf of remote devices.

The memory components may include system memory (1015), which may include read only memory (ROM) and random access memory (RAM). A basic input/output system (BIOS) may be stored in ROM. System software may be stored in the system memory (1015) including operating system software. The memory components may also include secondary memory (1020). The secondary memory (1020) may include a fixed disk (1021), such as a hard disk drive, and, optionally, one or more removable-storage interfaces (1022) for removable-storage components (1023). The removable-storage interfaces (1022) may be in the form of removable-storage drives (for example, magnetic tape drives, optical disk drives, etc.) for corresponding removable storage-components (for example, a magnetic tape, an optical disk, etc.), which may be written to and read by the removable-storage drive. The removable-storage interfaces (1022) may also be in the form of ports or sockets for interfacing with other forms of removable-storage components (1023) such as a flash memory drive, external hard drive, or removable memory chip, etc.

The computing device (1000) may include an external communications interface (1030) for operation of the computing device (1000) in a networked environment enabling transfer of data between multiple computing devices (1000). Data transferred via the external communications interface (1030) may be in the form of signals, which may be electronic, electromagnetic, optical, radio, or other types of signal. The external communications interface (1030) may enable communication of data between the computing device (1000) and other computing devices including servers and external storage facilities. Web services may be accessible by the computing device (1000) via the communications interface (1030). The external communications interface (1030) may also enable other forms of communication to and from the computing device (1000) including, voice communication, near field communication, radio frequency communications, such as Bluetooth™, etc.

The computer-readable media in the form of the various memory components may provide storage of computer-executable instructions, data structures, program modules, software units and other data. A computer program product may be provided by a computer-readable medium having stored computer-readable program code executable by the central processor (1010). A computer program product may be provided by a non-transient computer-readable medium, or may be provided via a signal or other transient means via the communications interface (1030).

Interconnection via the communication infrastructure (1005) allows the central processor (1010) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, and the like) may couple to the computing device (1000) either directly or via an I/O controller (1035). These components may be connected to the computing device (1000) by any number of means known in the art, such as a serial port. One or more monitors (1045) may be coupled via a display or video adapter (1040) to the computing device (1000).

Figure 11:
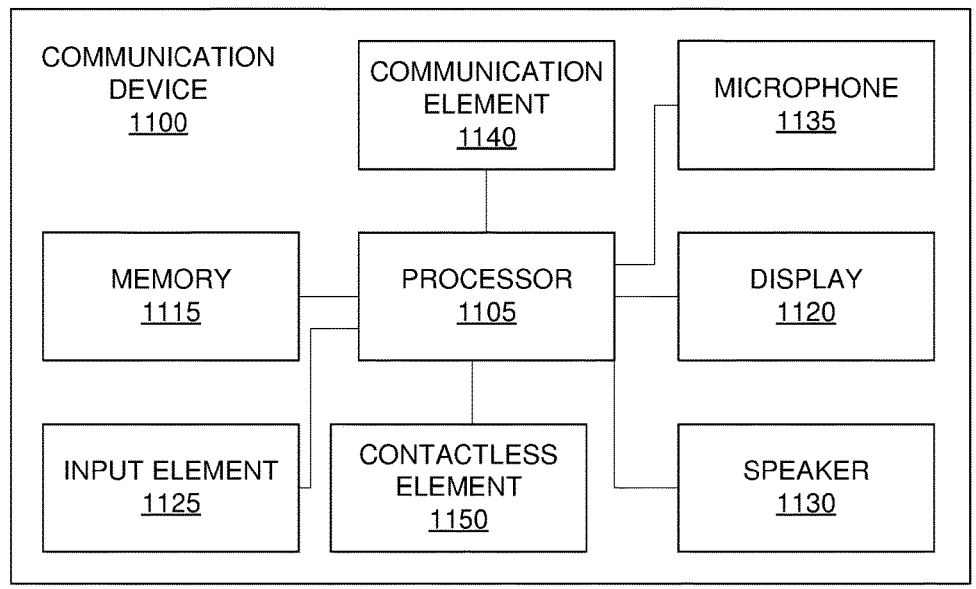
FIG. 11 shows a block diagram of a communication device that may be used in embodiments of the disclosure.

FIG. 11 shows a block diagram of a communication device (1100). The various participants and elements in the previously described system diagrams, for example the mobile device (120, 620), may use any suitable number of subsystems or components of the communication device (1100). The communication device (1100) may be a cell phone, a feature phone, a smart phone, a satellite phone, or a computing device having a phone capability.

The communication device (1100) may include a processor (1105) (e.g., a microprocessor) for processing the functions of the communication device (1100) and a display (1120) to allow a user to see the phone numbers and other information and messages. The communication device (1100) may further include an input element (1125) to allow a user to input information into the device (e.g., input buttons, touch screen, etc.), a speaker (1130) to allow the user to hear voice communication, music, etc., and a microphone (1135) to allow the user to transmit his or her voice through the communication device (1100). The processor (1110) of the communication device (1100) may connect to a memory (1115). The memory (1115) may be in the form of a computer-readable medium that stores data and, optionally, computer-executable instructions.

The communication device (1100) may also include a communication element (1140) for connection to communication channels (e.g., a cellular telephone network, data transmission network, Wi-Fi™ network, satellite-phone network, Internet network, Satellite Internet Network, etc.). The communication element (1140) may include an associated wireless transfer element, such as an antenna. The communication element (1140) may include a subscriber identity module (SIM) in the form of an integrated circuit that stores an international mobile subscriber identity and the related key used to identify and authenticate a subscriber using the communication device (1100). One or more subscriber identity modules may be removable from the communication device (1100) or embedded in the communication device (1100).

The communication device (1100) may further include a contactless element (1150), which is typically implemented in the form of a semiconductor chip (or other data storage element) with an associated wireless transfer element, such as an antenna. The contactless element (1150) may be associated with (e.g., embedded within) the communication device (1100) and data or control instructions transmitted via a cellular network may be applied to the contactless element (1150) by means of a contactless element interface (not shown). The contactless element interface may function to permit the exchange of data and/or control instructions between mobile device circuitry (and hence the cellular network) and the contactless element (1150). The contactless element (1150) may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth™, infra-red, or other data transfer capability that can be used to exchange data between the communication device (1100) and an interrogation device. Thus, the communication device (1100) may be capable of communicating and transferring data and/or control instructions via both a cellular network and near field communications capability.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. In one embodiment, a software unit is implemented with a computer program product comprising a non-transient computer-readable medium containing computer program code, which can be executed by a processor for performing any or all of the steps, operations, or processes described. Software units or functions described in this application may be implemented as computer program code using any suitable computer language such as, for example, Java™, C++, or Perl™ using, for example, conventional or object-oriented techniques. The computer program code may be stored as a series of instructions, or commands on a non-transitory computer-readable medium, such as a random access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Finally, throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A method for positioning an output element within a three-dimensional environment including one or more output devices, the method comprising:
   obtaining movement data relating to movement of a mobile device along and/or about one or more of an x-axis, y-axis, and z-axis thereof, wherein the movement of the mobile device relates to manipulation of the orientation of the mobile device relative to its x-axis, y-axis and z-axis by a user wishing to control the positon of an output element;
   mapping the movement data to movement of a simulated output element along any one of the three axes in a virtual environment, the virtual environment simulating the three-dimensional environment; and
   associating the movement of the simulated output element with movement of an output element within the three-dimensional environment, so as to control the position of the output element within the three-dimensional environment by controlling output of the one or more output devices,
   wherein associating the movement of the simulated output element with movement of an output element within the three-dimensional environment includes:
      generating time-stamped coordinates based on a position of the simulated output element in the virtual environment; and
      associating the time-stamped coordinates with an output file arranged to control the position of the output element within the three-dimensional environment by controlling output of the one or more output devices, and
   wherein associating the movement of the simulated output element with movement of an output element within the three-dimensional environment further includes:
      determining speaker amplitude data, as matrix cross-point data, based on time-stamped coordinates and output device location data; and
      transmitting the speaker amplitude data to networked devices for amplified output of the sound source by speakers so as to position the sound source within the three-dimensional environment.

2. The method as claimed in claim 1, including generating the virtual environment, the virtual environment simulating the three-dimensional environment and including one or more simulated output devices and the simulated output element.

3. The method as claimed in claim 1, wherein obtaining movement data relating movement of the mobile device includes obtaining the movement data from one or both of an accelerometer and a gyroscope of the mobile device, wherein the accelerometer is a three-axis accelerometer and wherein the gyroscope is a three-axis gyroscope.

4. The method as claimed in claim 1, including periodically recording a set of coordinates based on the position of the simulated output element within the virtual environment.

5. The method as claimed in claim 1, wherein the output element is the sound source in an immersive sound environment in which the one or more output devices are speakers.

6. The method as claimed in claim 1, wherein the output element is one of a light beam or focal point of one or more light beams in a theatrical environment in which the one or more output devices are spot lights.

7. The method as claimed in claim 6, wherein associating the movement of the simulated output element with movement of an output element within the three-dimensional environment includes mapping movement of the simulated output element to movement of the output devices.

8. The method as claimed in claim 6, including generating time-stamped orientation coordinates of the output devices, and associating the time-stamped orientation coordinates of the output devices with a digital multiplex (DMX) signal.

9. A system for positioning an output element within a three-dimensional environment including one or more output devices, the system comprising:
   an obtaining component for obtaining movement data relating to movement of a mobile device along and/or about one or more of an x-axis, y-axis and z-axis thereof, wherein the movement of the mobile device relates to manipulation of the orientation of the mobile device relative to its x-axis, y-axis and z-axis by a user wishing to control the position of an output element;
   a mapping component for mapping the movement data to movement of a simulated output element along any one of three axes in a virtual environment, the virtual environment simulating the three-dimensional environment; and
   an associating component for associating the movement of the simulated output element with movement of an output element within the three-dimensional environment, so as to control the position of the output element within the three-dimensional environment by controlling output of the one or more output devices,
   wherein the associating component includes:
      a time-stamping component for generating time-stamped coordinates based on a position of the simulated output element in the virtual environment;
   wherein the associating component is configured to associate the time-stamped coordinates with an output file arranged to control the position of the output element within the three-dimensional environment by controlling output of the one or more output devices, and
   wherein the associating component further includes:
      an amplitude determining component for determining speaker amplitude data, as matrix cross-point data, based on time-stamped coordinates and output device location data; and,
      a transmitting component for transmitting the speaker amplitude data to networked devices for amplified output of the sound source by speakers so as to position the output element within the three-dimensional environment.

10. The system as claimed in claim 9, including a mobile device which provides the obtaining component and mapping component and which further includes:

a recording component for recording a set of coordinates based on the position of the simulated output element within the virtual environment; and a communication component for transmitting the set of coordinates to a server computer.

11. The system as claimed in claim 10, wherein the mobile device includes a movement sensor for sensing movement of the mobile device, wherein the movement sensor includes one or both of a gyroscope and an accelerometer, wherein the accelerometer is a three-axis accelerometer, wherein the gyroscope is a three-axis gyroscope, and wherein the obtaining component obtains movement data from the movement sensor.

12. The system as claimed in claim 10, wherein the recording component periodically records a set of coordinates based on the position of the simulated output element within the virtual environment.

13. The system as claimed in claim 10, including the server computer which provides the associating component and further includes:

a communication component for receiving a set of coordinates from the mobile device.

14. The system as claimed in claim 9, wherein the output element is the sound source in an immersive sound environment in which the one or more output devices are speakers.

15. The system as claimed in claim 9, wherein the output element is one of a light beam or focal point of one or more light beams in a theatrical environment in which the output devices are spot lights.

16. The system as claimed in claim 15, wherein the associating component maps movement of the simulated output element to movement of the output devices, wherein the associating component includes a time-stamping component for generating time-stamped orientation coordinates of the output devices, and wherein the associating component associates the time-stamped orientation coordinates of the output devices with a digital multiplex (DMX) signal.

* * * * *